April 1, 1941. E. J. McWHIRTER 2,236,627
TOOTHBRUSH AND HEAD
Filed Jan. 16, 1939
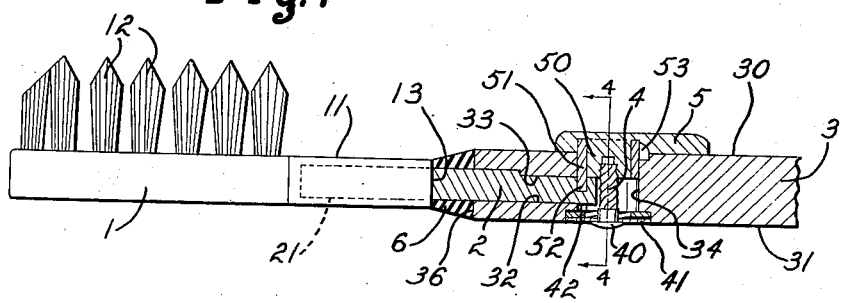
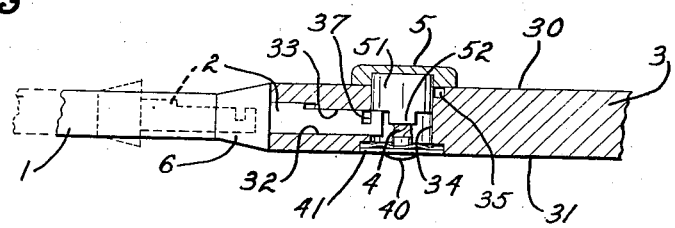
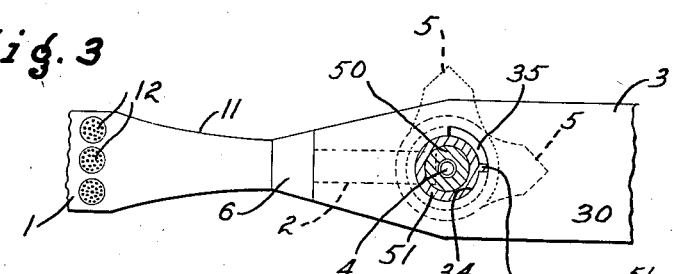
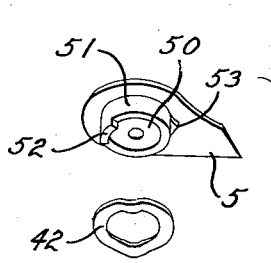
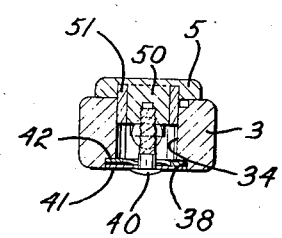
Inventor
Earl J. McWhirter
By Charles L. Reynolds
Attorney

Patented Apr. 1, 1941

2,236,627

UNITED STATES PATENT OFFICE 2,236,627

TOOTHBRUSH AND HEAD

Earl J. McWhirter, Seattle, Wash.

Application January 16, 1939, Serial No. 251,063

9 Claims. (Cl. 306—28)

My invention relates to devices such as toothbrushes, particularly such as are provided with removable heads. The present invention is an improvement upon the invention disclosed in my prior Patent No. 2,016,153, issued October 1, 1935.

By providing replacement heads carrying the bristles, which are securable when required upon a handle retained by the user, various advantages are attained, such as economy in cost, better sanitation in that the head is more frequently renewed, and the like. To fully realize these advantages, which largely stem from economy and low cost, the construction must be the most economical possible, consistent with the necessary strength and sanitary qualities, and it is the attainment of these ends broadly which is the primary object of the present invention.

Such economy and low cost can well be promoted by elimination of separate parts, and therefore the cost of manufacture and assembly of the same, and by a structure which avoids any necessity for close tolerances, but instead is adapted to quantity manufacturing and assembling operations, I have found that such ends can be attained best by manufacturing the parts of the mechanism which locks the head to the handle in large part of molded materials, having embedded therein a single metal sleeve capable of manufacture in progressive dies, automatically, which has formed upon it certain devices which, in former constructions, were made as separate pieces, and by interposing a compressible collar between the handle and the head, for the dual purpose of avoiding the necessity for close fitting parts, and to seal the interior cavities against entrance of water. This has the further advantage that, as the handle and the head are in large part made of molded plastics, and the locking lever is made of like material, similarly formed, the several parts of the brush, particularly those visible to the user, are almost all of similar material, and may be similarly colored or colored contrastingly and are thereby made more pleasing in appearance, and more attractive to the user.

Specifically, it is an object to adopt a construction which simplifies and lessens the cost of assembly of the several elements, particularly those constituting the locking means.

It is a further special object to employ, in so far as possible, elements which can be made by automatic machinery, and which require a minimum of effort in assembling.

Such a brush necessarily includes interior passages, which are not readily cleaned out, and it is therefore desirable to avoid the entrance of foreign matter, for instance water or tooth powder or paste, within such interior passages, and it is a further special object of the present invention to provide a means which materially deters or prevents such entrance of foreign matter.

It is a still further object to provide means which, regardless of slight inaccuracies of manufacture or assembly, will tend to hold the interlocked and separable parts firmly and securely in locking engagement.

With these and other objects in mind, as will appear hereafter, my invention comprises the novel parts, and the novel combination and arrangement thereof, as shown in the accompanying drawing, described in this specification, and as will be more particularly defined by the claims which terminate the same.

In the accompanying drawing I have shown my invention embodied in a form which is at present preferred by me.

Figure 1 is in part a side elevation and in part an axial section along the handle, illustrating the toothbrush with the several parts assembled and interlocked, that is to say, in position ready for use.

Figure 2 is a view similar to Figure 1, showing the parts in position for removal of the head from the handle, that is, unlocked but not separated.

Figure 3 is in part an elevation, and in part a section, at the plane of the near surface of the handle, through the locking means.

Figure 4 is a section transversely of the handle and axially of the locking means, taken substantially along the line 4—4 of Figure 1.

Figure 5 is an exploded perspective view, illustrating all the handle-carried parts which make up the locking mechanism.

The brush head 1, its stem 2, and the handle 3 do not in themselves differ necessarily in any large degree from the corresponding parts shown in my Patent No. 2,016,153, referred to above. The form and arrangement of the bristles 12 is largely a matter of choice; the shank 21 of the stem 2 is suitably formed and received within the neck 11 of the head and locked therein, as for instance by being molded in place, since the head is normally molded of plastic material; and the shape of the handle 3 is largely a matter of choice and convenience. Normally it is provided, at least near its outer end, with flat upper and lower surfaces 30 and 31.

As in my former patent, the end of the handle 3 is provided with a socket 32, which is non-circular, as for instance by being provided, inwardly from its entrance, with a flattened portion 33. The socket may be molded of this form, and the stem 2 is complementally shaped by automatic machinery in the course of manufacture, so that when it is received within the socket 32 the head will not rotate relative to the handle.

The handle is provided with a transverse bore 34, which is circular in cross section, which intersects the socket 32, so that the latter opens into the bore 34. Within this bore is received the hub 50 integrally formed upon a locking or operating lever 5. The hub 50 and the lever 5 may be molded of plastic material, by a pressure molding or by an extrusion process, or by any applicable process, and the lever 5 may be of such marginal extent that it lies flat upon the surface 30 of the handle and overlaps and closes this end of the bore 34, within which the hub 50 fits closely. I prefer, however, that the hub include a surrounding metal sleeve 51, which in the molding process may be partly embedded within the lever 5. The principal reason for employing a metal sleeve is that a locking dog and a stop lug are formed thereon, as later described, and they might not be of sufficient strength if formed of plastic material.

Means are provided to hold the operating lever 5 and the several integral parts thereof in the position described, and such means are conveniently formed as a drive pin 4, having a head 40, the end of the drive pin 4 being received within the hub 50, in alignment with its axis. The sleeve 51 resists undue expansion or deformation of the hub 50, when the pin 4 is driven in, and reinforces the hub at all times against any bursting stress. Either the head 40 is of sufficient extent to close this end of the bore 34 and to rest upon the face 31 of the handle, or it is enlarged, in effect, by washer means, such as the outside washer 41 and the spring washer 42, thus to close the end of the bore 34.

By the expedient of employing the metal sleeve 51 the latter may have formed in it, prior to its embedment in the lever 5, and by automatic machinery, various portions which take some strain, and thereby the molded parts are relieved of stress. For instance, at the lower or inner edge of the sleeve 51 a projecting locking dog 52 of some arcuate extent is formed by automatic machinery, when the sleeve is flat, which dog 52 is intended to engage a complemental locking means upon the inwardly projecting end of the stem 2. The stem 2, at its inner end, is provided with a transverse shoulder, such as may be formed by an arcuate transverse slot 37, which, when the stem 2 is fully pressed within its socket 32, lies concentric with the axis of the bore 34, and in the path of oscillation of the locking dog 52. When the parts are thus engaged the head 1 is securely locked upon the end of the handle 3.

It is desirable to avoid excessive oscillation or complete rotation of the operating lever 5, and to this end I provide a stop lug 53, which is conveniently formed upon the sleeve 51. This stop lug is conveniently received within a counterbore 35 of the handle, which counterbore extends through approximately a quarter-circle. It is convenient to form the stop lug 53 upon the sleeve 51 for the reason that it can be formed by an automatic stamping operation when the sleeve is in the flat, and because in use it takes some stress, and being small, is not likely to be broken off, as it might were it made of plastic material.

In order that the under surface 31 may be smooth it is preferred that the washers 41 and 42 be received within a counterbore 38, which is circular in extent, and which forms a depression in the face 31 of just sufficient depth that the outer washer 41 will come flush with the surface 31.

The operating lever 5 and the parts integral therewith are conveniently formed and assembled and molded so that they may be handled in the final assembly as one piece. Other than this piece, the locking mechanism comprises only the two washers and the drive pin, all as shown in Figure 5, and the washers might be omitted were the head of the drive pin made sufficiently large, and if it fitted closely enough. The drive pin is readily engaged within the end of the hub 50 of plastic material, so that the entire assembly is an operation performed easily and simply, with the expenditure of very little time, and without requiring any fitting or finishing whatever.

It will be observed that the accuracy and effectiveness of the lock between the lug 52 and the slot 37 are dependent upon accurate registry of these two interlocking elements, and upon the absence of any looseness permitting movement of the stem 2 in the direction of its axis. Such extreme accuracy is difficult to obtain economically or while using the preferred manufacturing processes. Moreover, it is desirable to avoid the possibility of entrance of water or water-borne paste or powder through the socket 32 and along the stem 2. Therefore to make the lock tight, regardless of inaccuracies of manufacture, and to seal the opening against the entrance of foreign matter, I prefer to interpose between the shoulder 13 at the end of the head and the extreme end 36 of the handle a collar 6 surrounding the stem 2, and formed of elastic rubber or rubber composition. This rubber collar 6 is of such length that unless the collar is compressed, the slot 37 will not project inwardly sufficiently to be engaged by the locking dog 52, and this position of the parts, with the collar relaxed, is shown in Figure 2. In order that the locking elements 37 and 52 may be interengaged it is necessary to compress the sleeve 6 into the position shown in Figure 1. When it is thus compressed it serves two purposes—it acts as a spring urging the stem 2 outwardly, and therefore holding the interlocked elements securely in engagement, likewise compensating for inaccuracies in manufacture, and it presses tightly against the shoulder 13 and the end 36, and prevents the entrance of foreign matter, either into the socket 32 or along the stem 2.

What I claim as my invention is:

1. In combination with a brush head having a non-circular stem, a handle complementally socketed to receive the stem, the handle having a transverse circular bore intersecting the socket, an external operating lever closing the bore at one end and having an integral hub closely received within the bore for oscillation of the lever, means including a headed pin closing the opposite end of the bore, the pin being received in the end of the hub to secure each other mutually within the bore, a locking dog integral with and projecting in an axial direction from the hub, the stem of the head being of a length to project within the bore, and having an arcuate slot concentric with the bore and disposed to be engaged by the locking dog, as the latter oscillates, to lock the head removably upon the handle.

2. In combination with a brush head having a non-circular stem, a handle complementally socketed to receive the stem, the handle having a transverse circular bore intersecting the socket, one end of the bore having a ledge depressed below the face of the handle, of approximately 90° in extent, an operating lever seated upon the face of the handle, at the latter end of the bore, and closing the bore, and having an integral hub closely fitting within the bore for oscillation of the lever, a stop lug projecting from the hub and received within the aforesaid depression to limit the extent of such oscillation, means including a headed pin closing the opposite end of the bore, the pin being received in the end of the hub to secure each other mutually in assembled relation, the stem of the head being of such length that it extends within the bore, locking means carried by the hub, and complemental locking means carried by the inwardly projecting end of the stem, engageable and disengageable by the hub-carried locking means by the permitted oscillation, to secure the head upon the handle when the parts are in locked position.

3. In combination with a shouldered brush head having a non-circular stem, a handle complementally socketed in its end, and having a transverse through bore intersecting said socket, the through bore having a circular counterbore in one face of the handle, and a quarter-circular counterbore in the opposite face of the handle, the stem being of a length to project within the through bore when the head's shoulder seats upon the end of the handle, and having a transverse slot in that portion which projects within the bore, curved concentrically with the bore, a locking lever having an integral hub closely received within that end of the bore which has the quarter-circular counterbore, the margin of the lever overlying and closing this end of the bore and counterbore, and carrying a stop lug received and movable within the counterbore to limit oscillation of the lever, the lever's hub having an axially projecting dog engageable with and disengageable from the transverse slot in the head's stem by the permitted oscillation of the lever, and a pin and washer means thereon, seated in the circular counterbore to close the latter, the pin entering and engaging the hub of the lever to secure the latter upon the handle.

4. In combination with a brush head having a stem, a handle socketed in its end to closely receive the stem, and thereby to prevent material relative transverse movement when the stem is so received, the handle having a transverse bore intersecting the socket, and the stem being of sufficient length to project within the transverse bore, and having an arcuate slot in such projecting portion, which slot, by sufficient inward projection of the stem, may be disposed concentric with the bore, a locking dog supported within the bore for oscillation about the axis of the bore, in position to engage within and to disengage such arcuate slot, but only when concentrically positioned, by such oscillation, and a rubber sleeve surrounding the stem, interposed between the adjoining ends of the head and handle, and of such length that it must be compressed between and thereby forced against the head and the handle, to bring the arcuate slot into registry with the path of the oscillatable locking dog, and to seal the ends of the head and handle against entry of foreign matter.

5. In combination with a brush head having a non-circular stem, a handle complementally socketed in its end, to receive the stem, the handle having a transverse circular bore intersecting the socket, an external operating lever molded of plastic material, and incorporating a metal sleeve surrounding an integral hub, and partly embedded within the lever, said lever closing the bore at one end, and the sleeve fitting closely within the bore to permit oscillation of the lever, means including a headed pin, received within the hub at the latter's axis, closing the opposite end of the bore, the engagement of the pin and the lever mutually holding each other in assembled relation, the stem of the head being of such length that it extends within the bore, locking means formed upon the sleeve, and complemental locking means carried by the inwardly projecting end of the stem, engageable and disengageable by the sleeve-carreid locking means by the oscillation of the lever and sleeve, to secure the head upon the handle when the parts are in locked position.

6. In combination with a brush head having a non-circular stem, a handle complementally socketed in its end, to receive the stem, the handle having a transverse circular bore intersecting the socket, an external operating lever molded of plastic material, and incorporating a metal sleeve surrounding an integral hub, and partly embedded within the lever, said lever closing the bore at one end, and the sleeve fitting closely within the bore to permit oscillation of the lever, means including a drive pin, received within the hub at the latter's axis, closing the opposite end of the bore, the engagement of the pin and the lever mutually holding each other in assembled relation, the stem of the head being of such length that it extends within the bore, locking means formed upon the sleeve, complemental locking means carried by the inwardly projecting end of the stem, engageable and disengageable by the sleeve-carried locking means by the oscillation of the lever and sleeve, to secure the head upon the handle when the parts are in locked position, oscillation-limiting means formed upon and projecting radially from the sleeve, and complemental means formed upon the handle and engageable by the sleeve-carried means to stop the lever in locked and in unlocked positions.

7. In combination with a brush head having a stem, a handle socketed in its end to closely receive the stem, the stem having a transverse shoulder disposed within the socket, when assembled, means carried by the handle, and guided for movement in a fixed path from a disengaged position into engagement with the stem's shoulder, thereby to lock the head to the handle, and a rubber sleeve interposed between the head and the handle, to hold the shoulder sufficiently withdrawn that the locking means may not engage it, but resiliently yieldable in the direction of the stem's length to permit such engagement, and by its tendency to expand acting to retain parts in such engagement, regardless of inaccuracies of manufacture and assembly.

8. In combination with a brush head having a non-circular stem, a handle complementally socketed in its end, to receive the stem, the handle having a transverse circular bore intersecting the socket, an external operating lever molded of plastic material, and incorporating a metal sleeve surrounding an integral hub, and partly embedded within the lever, said lever closing the bore at one end, and the sleeve fitting closely within the bore to permit oscillation of the lever, means including a headed pin, received within the hub at the latter's axis, closing the opposite end of the bore, the engagement of the pin and the lever mutually holding each other in assembled relation, the stem of the head being of such length that it extends within the bore, locking means formed upon the sleeve, complemental locking means carried by the inwardly projecting end of the stem, engageable and disengageable by the sleeve-carried locking means by the oscillation of the lever and sleeve, to secure the head upon the handle when the parts are in locked position, and a rubber sleeve surrounding the stem, between the head and the handle, and of sufficient length, when uncompressed, to hold the two locking means separated, lengthwise of the stem, and permitting their engagement only when compressed, thereby to be pressed tightly against the adjoining ends of the head and handle.

9. In combination with a brush head having a stem, a handle socketed to receive said stem, and having a transverse bore intersecting its socket, and means to lock the head upon the handle, comprising an external operating lever molded of plastic material, and incorporating a metal sleeve surrounding an integral molded hub, which sleeve is partly embedded within the lever, said hub closely fitting within the bore at one end, and the operating lever extending radially outward beyond the hub at all points, and fitting closely against the face of the handle to close the bore at this end, means closing the opposite end of the bore, and engageable with the hub for mutual retention within the bore, and means incorporated in said metal sleeve, and engageable with the stem by oscillation of the operating lever, to resist forces tending to withdraw the stem from within the socket.

E. J. McWHIRTER.